US012029251B2

(12) United States Patent
Batista et al.

(10) Patent No.: US 12,029,251 B2
(45) Date of Patent: Jul. 9, 2024

(54) INDUCTIVELY HEATABLE AEROSOL-FORMING RODS AND SHAPING DEVICE FOR USAGE IN THE MANUFACTURING OF SUCH RODS

(71) Applicant: Philip Morris Products S.A., Neuchatel (CH)

(72) Inventors: Rui Nuno Batista, Neuchatel (CH); Ivan Prestia, Zola Predosa Bologna (IT)

(73) Assignee: Philip Morris Products S.A., Neuchatel (CH)

( * ) Notice: Subject to any disclaimer, the term of this patent is extended or adjusted under 35 U.S.C. 154(b) by 428 days.

(21) Appl. No.: 17/434,079

(22) PCT Filed: Feb. 27, 2020

(86) PCT No.: PCT/EP2020/055090
§ 371 (c)(1),
(2) Date: Aug. 26, 2021

(87) PCT Pub. No.: WO2020/174028
PCT Pub. Date: Sep. 3, 2020

(65) Prior Publication Data

US 2022/0132932 A1 May 5, 2022

(30) Foreign Application Priority Data

Feb. 28, 2019 (EP) .................................... 19159889

(51) Int. Cl.
*A24F 40/465* (2020.01)
*A24B 15/12* (2006.01)
(Continued)

(52) U.S. Cl.
CPC ............ *A24F 40/465* (2020.01); *A24B 15/12* (2013.01); *A24C 5/01* (2020.01); *A24D 1/002* (2013.01);
(Continued)

(58) Field of Classification Search
None
See application file for complete search history.

(56) References Cited

U.S. PATENT DOCUMENTS

2017/0055582 A1 3/2017 Blandino et al.
2018/0184713 A1 7/2018 Mironov et al.
(Continued)

FOREIGN PATENT DOCUMENTS

CN 206227715 U 6/2017
CN 107920597 A 4/2018
(Continued)

OTHER PUBLICATIONS

International Search Report and Written Opinion dated May 29, 2020 in PCT/EP2020/055090 filed Feb. 27, 2020.
(Continued)

*Primary Examiner* — Tho D Ta
(74) *Attorney, Agent, or Firm* — Oblon, McClelland, Maier & Neustadt, L.L.P.

(57) ABSTRACT

An inductively heatable aerosol-forming rod for an aerosol-generating article is provided, including: at least one cylindrical core portion including at least one of a first aerosol-forming substrate and a first flavoring material; a first elongate susceptor laterally abutting the core portion at a first side along a longitudinal axis of the rod; a second elongate susceptor laterally abutting the core portion at second side along the longitudinal axis opposite to the first side such that the core portion is sandwiched between the first and the second susceptors; and a sleeve portion
(Continued)

arranged around the core portion and the first and the second susceptors, the sleeve portion including at least one of a filler material, a second aerosol-forming substrate, and a second flavoring material. A shaping device for manufacturing of the inductively heatable aerosol-forming rods is also provided.

15 Claims, 3 Drawing Sheets

(51) Int. Cl.

| | |
|---|---|
| ***A24C 5/01*** | (2020.01) |
| ***A24D 1/00*** | (2020.01) |
| ***A24D 1/20*** | (2020.01) |
| ***A24F 40/20*** | (2020.01) |
| ***H05B 6/10*** | (2006.01) |

(52) U.S. Cl.

CPC ................ *A24D 1/20* (2020.01); *A24F 40/20* (2020.01); *H05B 6/105* (2013.01)

(56) References Cited

U.S. PATENT DOCUMENTS

| | | | |
|---|---|---|---|
| 2018/0242636 | A1 | 8/2018 | Blandino et al. |
| 2018/0310622 | A1 | 11/2018 | Mironov et al. |
| 2020/0107571 | A1 | 4/2020 | Sanna et al. |

FOREIGN PATENT DOCUMENTS

| | | | | | |
|---|---|---|---|---|---|
| CN | 108135266 | A | | 6/2018 | |
| CN | 108601397 | A | | 9/2018 | |
| EA | 030599 | B1 | | 8/2018 | |
| JP | 6210368 | B2 | | 9/2017 | |
| JP | 2018-523983 | A | | 8/2018 | |
| JP | 2018-527889 | A | | 9/2018 | |
| JP | 2018-528765 | A | | 10/2018 | |
| JP | 2018-537077 | A | | 12/2018 | |
| RU | 2 600 912 | C1 | | 10/2016 | |
| RU | 2 672 029 | C2 | | 11/2018 | |
| WO | WO 2015/000974 | A1 | | 1/2015 | |
| WO | WO 2015/177256 | A1 | | 11/2015 | |
| WO | WO 2017/029268 | A1 | | 2/2017 | |
| WO | WO 2017/036954 | A1 | | 3/2017 | |
| WO | WO-2017068100 | A1 | * | 4/2017 | ............ A24D 1/002 |
| WO | WO 2017/178394 | A1 | | 10/2017 | |
| WO | 2018/206615 | A2 | | 11/2018 | |
| WO | WO 2018/229087 | A1 | | 12/2018 | |
| WO | 2019/030353 | A1 | | 2/2019 | |
| WO | WO-2019030000 | A1 | * | 2/2019 | ........... A24F 40/465 |

OTHER PUBLICATIONS

Russian Search Report dated Jun. 7, 2023 in Russian Patent Application No. 2021128162 (with English Translation), 4 pages.

Chinese Office Action mailed on Nov. 11, 2023 issued in Chinese Patent Application No. 202080017150.7 filed on Feb. 27, 2020, with English Translation, total 18 pages (citing documents 15 and 16, therein).

Japanese Office Action dated Mar. 4, 2024, issued in counterpart Japanese patent application No. 2021-549830 (with English translation).

* cited by examiner

INDUCTIVELY HEATABLE AEROSOL-FORMING RODS AND SHAPING DEVICE FOR USAGE IN THE MANUFACTURING OF SUCH RODS

The present invention relates to inductively heatable aerosol-forming rods comprising one or more aerosol-forming substrates capable to form an inhalable aerosol when heated. The invention further relates to a shaping device for usage in the manufacturing of such inductively heatable aerosol-forming rods.

Generating an inhalable aerosol based on inductively heating an aerosol-forming substrate is generally known from prior art. For heating the substrate, it may be arranged in thermal proximity of or direct physical contact with a susceptor which is inductively heated by an alternating electromagnetic field. The field may be provided by an induction source that is part of an aerosol-generating device. Both, the susceptor and the aerosol-forming substrate may be assembled in an inductively heatable aerosol-forming rod. Among other elements, the rod may be integral part of a rod-shaped aerosol-forming article which may be received in a cylindrical receiving cavity of an aerosol-generating device that comprises the induction source. As part of the induction source, the device may comprise, for example, a helical induction coil which coaxially surrounds the cylindrical receiving cavity such as to provide an alternating electromagnetic field within the cavity for heating the susceptor. In operation of the device, volatile compounds are released from the heated aerosol-forming substrate in the article and entrained in an airflow drawn through the article during a user's puff. As the released compounds cool, they condense to form an aerosol.

It would be desirable to have an inductively heatable aerosol-forming rod for use in an aerosol-generating article which provides a large variety of different aerosols. It would be desirable that such an inductively heatable aerosol-forming rod is compatible with existing inductively heating devices comprising a cylindrical receiving cavity. Furthermore, it would be desirable to have a shaping device for usage in the manufacturing of such aerosol-forming rods.

According to the invention there is provided an inductively heatable aerosol-forming rod for use in an aerosol-generating article. The aerosol-forming rod comprises at least one cylindrical core portion comprising at least one of a first aerosol-forming substrate and a first flavoring material. The aerosol-forming rod further comprises a first elongate susceptor laterally abutting the cylindrical core portion at a first side along a longitudinal axis of the aerosol-forming rod. The aerosol-forming rod also comprises a second elongate susceptor laterally abutting the cylindrical core portion at second side along a longitudinal axis of the aerosol-forming rod opposite to the first side such that the cylindrical core portion is sandwiched between the first elongate susceptor and the second elongate susceptor. In addition, the aerosol-forming rod comprises a sleeve portion arranged around the core portion, the first susceptor and the second susceptor, wherein the sleeve comprises at least one of a filler material, a second aerosol-forming substrate and a second flavoring material.

Having at least two different portions within an inductively heatable aerosol-forming rod, namely, the sleeve portion and the core portion, advantageously allows for enhancing the diversity of producible aerosols by using the different portions for different purposes. One purpose may be providing one or more specific sensorial stimulations, for example, providing specific flavors, providing specific tobacco notes, providing nicotine, or providing stimulation by enhancing the visibility of aerosolization. Such effects may be achieved by a proper choice of the sensorial media of the sleeve portion and the core portion, for example, by a proper choice of the first aerosol-forming substrate and the second aerosol-forming substrate. For example, a first sensorial medium may be homogenized tobacco, like for example tobacco cast leaf to provide tobacco content, whereas a second sensorial medium may be an aerosol-forming liquid to produce a large aerosol volume and further flavor components. Other specific stimulations may relate, for example, to a specific resistance to draw or to a specific haptic effect known from conventional tobacco products. Such effects may be achieved by at least one of a proper choice of the geometry of the sleeve portion, for example, to provide familiar haptics, and a proper choice of the filler material, for example, to provide a specific resistance to draw.

Preferably, the core portion and the sleeve portion are individual physical bodies or entities separate from each other. That is, the core portion and the sleeve portion may be separate from each. Accordingly, the core portion may be denoted as core body, and the sleeve portion may be denoted as sleeve body. The core body and the sleeve body may be individual entities, that is, separate from each other. In particular, the aerosol-generating article may comprise a core body, in particular a core body defining the core portion. Likewise, the aerosol-generating article may comprise a sleeve body, in particular a sleeve body defining the sleeve portion.

Having at least a first susceptor and a second susceptor advantageously enables to provide different heating zones inside the aerosol-forming rod. A first heating zone is provided by that portion of the heating profile of the first susceptor which extends along the longitudinal axis of the rod at an outer side of the first susceptor opposite to the inner side of the first susceptor which abuts the core portion. Likewise, a second heating zone is provided by that portion of the heating profile of the first susceptor which extends along the longitudinal axis of the rod at an outer side of the second susceptor opposite to the inner side of the second susceptor which abuts the core portion. A third heating zone is provided along the longitudinal axis of the rod in the area between the first susceptor and the second susceptor, that is, in an area which overlaps with the cylindrical core portion. This third heating zone substantially results from the overlap of those portions of the heating profiles of the first susceptor and the second susceptor which are located between the first susceptor and the second susceptor. Accordingly, the first heating zone and the second heating zone may be used to heat the sleeve portion, whereas the third heating zone may be used to heat the core portion. Due to the overlap of two heating profiles, the third heating zone may achieve higher temperatures than the first heating zone and the second heating zone. Advantageously, different heating temperatures may allow for specifically adjusting the release of volatile compounds from the core portion and the sleeve portion. In particular the amount of the released compound may be adjusted by choosing a suitable combination of a specific heating temperature and a specific sensorial medium having a specific releasing temperature. Thus, the different heating zones may be beneficially used to design a large variety of different aerosols by providing different aerosols or flavors in different quantities from different portions of the aerosol-forming rod.

Furthermore, the inductively heatable aerosol-generating rod according to the present invention may be used to manufacture rod-shaped aerosol-generating articles which are compatible with existing inductively heating aerosol-generating devices comprising a cylindrical receiving cavity. Hence, the use of inductively heating devices currently available may be continued. In particular, existing inductively heating devices do not require any modification.

The first elongate susceptor may laterally abut the cylindrical core portion in a non-bonded manner. Likewise, the second elongate susceptor may laterally abut the cylindrical core portion in a non-bonded manner. As used herein, the term "abutting in a non-bonded manner" refers to an arrangement of the respective susceptor relative to the cylindrical core portion in which the respective susceptor and the core portion are not fixedly and not permanently attached to each other. In particular, the term "abutting in a non-bonded manner" is to be understood such that the respective susceptor releasably abuts the core portion and can be removed from the core portion in a substantially non-destructive manner. In any case, the term "abutting in a non-bonded manner" excludes a configuration, in which one of the respective susceptor or the core portion is coated onto the respective other one. In particular, "abutting in a non-bonded manner" excludes a fixed or rigid bonding between the respective susceptor and the core portion, in particular a chemical bonding or a bonding caused by an adhesive with does not belong to either one of the core portion and the respective susceptor. Nevertheless, having the respective susceptor abutting the core portion may include some kind of non-permanent attraction between the core portion and the susceptor, such as some kind of non-permanent adhesion between the core portion and the respective susceptor which, for example, might be due to a possibly adhesive nature of an aerosol-forming substrate. That is, "abutting in a non-bonded manner" may include "abutting in a non-permanently bonded manner". Having the respective susceptor laterally abutting the cylindrical core portion in a non-bonded manner may result from merely placing the respective susceptor alongside the core portion, in particular, by using a shaping device according to the present invention and as described in detail further below.

As used herein, the term "aerosol-forming substrate" denotes a substrate formed from or comprising an aerosol-forming material that is capable of releasing volatile compounds upon heating for generating an aerosol. The aerosol-forming substrate is intended to be heated rather than combusted in order to release the aerosol-forming volatile compounds.

The aerosol-forming substrate may be a solid, a paste-like or a liquid aerosol-forming substrate. In any of these states, the aerosol-forming substrate may comprise both, solid and liquid components.

The aerosol-forming substrate may comprise a tobacco-containing material containing volatile tobacco flavor compounds, which are released from the substrate upon heating.

Alternatively or additionally, the aerosol-forming substrate may comprise a non-tobacco material.

As to this, the aerosol-forming substrate may comprise, for example, one or more of: powder, granules, pellets, shreds, spaghetti strands, strips or sheets containing one or more of: herb leaf, tobacco leaf, fragments of tobacco ribs, reconstituted tobacco, homogenized tobacco, extruded tobacco and expanded tobacco and combinations thereof.

The aerosol-forming substrate may further comprise at least one aerosol former. The at least one aerosol former may be selected from the polyols, glycol ethers, polyol ester, esters, and fatty acids and may comprise one or more of the following compounds: glycerin, erythritol, 1,3-butylene glycol, tetraethylene glycol, triethylene glycol, triethyl citrate, propylene carbonate, ethyl laurate, triacetin, meso-Erythritol, a diacetin mixture, a diethyl suberate, triethyl citrate, benzyl benzoate, benzyl phenyl acetate, ethyl vanillate, tributyrin, lauryl acetate, lauric acid, myristic acid, and propylene glycol.

One or more aerosol formers may be combined to take advantage of one or more properties of the combined aerosol formers. For example, triacetin may be combined with glycerin and water to take advantage of the triacetin's ability to convey active components and the humectant properties of the glycerin.

The aerosol former may also have humectant type properties that help maintain a desirable level of moisture in an aerosol-forming substrate when the substrate is composed of a tobacco-based product, particularly including tobacco particles. In particular, some aerosol formers are hygroscopic material that functions as a humectant, that is, a material that helps keep a tobacco substrate containing the humectant moist.

In particular the aerosol-forming substrate may comprise one or more aerosol-formers with a weight proportion in a range of 12 percent to 20 percent, preferably 16 percent to 20 percent, most preferably 17 percent to 18 percent by weight of the aerosol-forming substrate.

The aerosol-forming substrate may comprise other additives and ingredients. The aerosol-forming substrate preferably comprises nicotine. The aerosol-forming substrate may comprise flavourants, in particular additional tobacco or non-tobacco volatile flavor compounds, to be released upon heating of the aerosol-forming substrate. The aerosol-forming substrate also may contain capsules that, for example, include the additional tobacco or non-tobacco volatile flavor compounds and such capsules may melt during heating of the solid aerosol-forming substrate. The aerosol-forming substrate also may comprise a binder material.

Preferably, the aerosol-forming substrate is an aerosol-forming tobacco substrate, that is, a tobacco containing substrate. The aerosol-forming substrate may contain volatile tobacco flavor compounds, which are released from the substrate upon heating. The aerosol-forming substrate may comprise or consist of reconstituted tobacco, such as homogenized tobacco material. Homogenized tobacco material may be formed by agglomerating particulate tobacco. In particular, the aerosol-forming substrate may comprise or consist of cut and blended tobacco lamina. The aerosol-forming substrate may additionally comprise a non-tobacco material, for example homogenized plant-based material other than tobacco. Preferably, the reconstituted tobacco is made to a large extend from blended tobacco material, in particular leaf lamina, processed stems and ribs, homogenized plant material, like for example made into sheet form using casting or papermaking processes. The reconstituted tobacco may also comprise other after-cut, filler tobacco, binder, fibers or casing. The reconstituted tobacco may comprise at least 25 percent of plant leaf lamina, more preferably, at least 50 percent of plant leaf lamina, still more preferably at least 75 percent of plant leaf lamina and most preferably at least 90 percent of plant leaf lamina. Preferably, the plant material is one of tobacco, mint, tea and cloves. However, the plant material may also be another plant material that has the ability to release substances upon the application of heat that can subsequently form an aerosol.

Preferably, the tobacco plant material comprises lamina of one or more of bright tobacco lamina, dark tobacco, aromatic tobacco and filler tobacco. Bright tobaccos are tobaccos with a generally large, light colored leaves. Throughout the specification, the term "bright tobacco" is used for tobaccos that have been flue cured. Examples for bright tobaccos are Chinese Flue-Cured, Flue-Cured Brazil, US Flue-Cured such as Virginia tobacco, Indian Flue-Cured, Flue-Cured from Tanzania or other African Flue Cured. Bright tobacco is characterized by a high sugar to nitrogen ratio. From a sensorial perspective, bright tobacco is a tobacco type which, after curing, is associated with a spicy and lively sensation. As used herein, bright tobaccos are tobaccos with a content of reducing sugars of between about 2.5 percent and about 20 percent of dry weight base of the leaf and a total ammonia content of less than about 0.12 percent of dry weight base of the leaf. Reducing sugars comprise for example glucose or fructose. Total ammonia comprises for example ammonia and ammonia salts. Dark tobaccos are tobaccos with a generally large, dark colored leaves. Throughout the specification, the term "dark tobacco" is used for tobaccos that have been air cured. Additionally, dark tobaccos may be fermented. Tobaccos that are used mainly for chewing, snuff, cigar, and pipe blends are also included in this category. Typically, these dark tobaccos are air cured and possibly fermented. From a sensorial perspective, dark tobacco is a tobacco type which, after curing, is associated with a smoky, dark cigar type sensation. Dark tobacco is characterized by a low sugar to nitrogen ratio. Examples for dark tobacco are Burley Malawi or other African Burley, Dark Cured Brazil Galpao, Sun Cured or Air Cured Indonesian Kasturi. As used herein, dark tobaccos are tobaccos with a content of reducing sugars of less than about 5 percent of dry weight base of the leaf and a total ammonia content of up to about 0.5 percent of dry weight base of the leaf. Aromatic tobaccos are tobaccos that often have small, light colored leaves. Throughout the specification, the term "aromatic tobacco" is used for other tobaccos that have a high aromatic content, e.g. of essential oils. From a sensorial perspective, aromatic tobacco is a tobacco type which, after curing, is associated with spicy and aromatic sensation. Examples for aromatic tobaccos are Greek Oriental, Oriental Turkey, semi-oriental tobacco but also Fire Cured, US Burley, such as Perique, Rustica, US Burley or Meriland. Filler tobacco is not a specific tobacco type, but it includes tobacco types which are mostly used to complement the other tobacco types used in the blend and do not bring a specific characteristic aroma direction to the final product. Examples for filler tobaccos are stems, midrib or stalks of other tobacco types. A specific example may be flue cured stems of Flue Cure Brazil lower stalk.

Preferably, the aerosol-forming substrate may comprise a tobacco web, preferably a crimped web. The tobacco web may comprise tobacco material, fiber particles, a binder material and an aerosol former. Preferably, the tobacco web is cast leaf. Cast leaf is a form of reconstituted tobacco that is formed from a slurry including tobacco particles. The cast leaf may further comprise fiber particles or aerosol former, or both of fiber particles and aerosol former, and a binder and for example also flavors. Tobacco particles may be of the form of a tobacco powder having particles in the order of 10 micrometer to 250 micrometer, preferably in the order of 20 micrometer to 80 micrometer or 50 micrometer to 150 micrometer or 100 micrometer to 250 micrometer, depending on the desired sheet thickness and casting gap of a corresponding casting box. The casting gap influences the thickness of the sheet. Fiber particles may include tobacco stem materials, stalks or other tobacco plant material, and other cellulose-based fibers such as for example plant fibers, preferably wood fibers or flax fibers or hemp fibers. Fiber particles may be selected based on the desire to produce a sufficient tensile strength for the cast leaf versus a low inclusion rate, for example, an inclusion rate between approximately 2 percent to 15 percent. Alternatively, fibers, such as vegetable fibers, may be used either with the above fiber particles or in the alternative, including hemp and bamboo or combinations of various fiber types. Aerosol formers included in the slurry forming the cast leaf or used in other aerosol-forming tobacco substrates may be chosen based on one or more characteristics. Functionally, the aerosol former provides a mechanism that allows it to be volatilized and convey nicotine or flavoring or both in an aerosol when heated above the specific volatilization temperature of the aerosol former. Different aerosol formers typically vaporize at different temperatures. The aerosol-former may be any suitable known compound or mixture of compounds that, in use, facilitates formation of a stable aerosol. A stable aerosol is substantially resistant to thermal degradation at the operating temperature for heating the aerosol-forming substrate. An aerosol former may be chosen based on its ability, for example, to remain stable at or around room temperature but able to volatize at a higher temperature, for example, between 40 degree Celsius and 450 degree Celsius, preferably between 40 degree Celsius and 250 degree Celsius.

A crimped tobacco sheet, for example cast leaf, may have a thickness in a range of between about 0.02 millimeter and about 0.5 millimeter, preferably between about 0.08 millimeter and about 0.2 millimeter.

Preferably, in any configuration, the core portion is always used for aerosol generation. The core portion may comprise at least one of:

- a porous substrate or foam based on tobacco fibers, wherein the tobacco fibers at least partially form the first aerosol-forming substrate;
- a porous substrate or foam based on botanical fibers, wherein the botanical fibers at least partially form the first aerosol-forming substrate;
- a filler comprising a cut tobacco material, wherein the cut tobacco material at least partially forms the first aerosol-forming substrate;
- a filler comprising a cut botanical material, wherein the cut botanical material at least partially forms the first aerosol-forming substrate;
- a liquid retention material including an aerosol-forming liquid, wherein the aerosol-forming liquid at least partially forms the first aerosol-forming substrate;
- a liquid retention material including at least one flavoring substance, wherein the flavoring substance at least partially forms the first flavoring material;
- cellulose fibers or cellulose-based fibers, including at least one flavoring substance, wherein the flavoring substance at least partially forms the first flavoring material.

In principle, the sleeve portion may comprise the same material configurations as described above. Accordingly, the sleeve portion may comprise at least one of:

- a porous substrate or foam based on tobacco fibers, wherein the tobacco fibers at least partially form the second aerosol-forming substrate;
- a porous substrate or foam based on botanical fibers, wherein the botanical fibers at least partially form the second aerosol-forming substrate;
- a filler comprising a cut tobacco material, wherein the cut tobacco material at least partially forms the second aerosol-forming substrate;

a filler comprising a cut botanical material, wherein the cut botanical material at least partially forms the second aerosol-forming substrate;

a liquid retention material including an aerosol-forming liquid, wherein the aerosol-forming liquid at least partially forms the second aerosol-forming substrate;

a liquid retention material including at least one flavoring substance, wherein the flavoring substance at least partially forms the second flavoring material;

cellulose fibers or cellulose-based fibers;

cellulose fibers or cellulose-based fibers, including a flavoring substance, wherein the flavoring substance at least partially forms the second flavoring material;

acetate tow expanded fibers;

botanical expanded fibers; or paper.

As used herein, the term "liquid retention material" refers to a high retention or high release material (HRM) for storing a liquid. The liquid retention material is configured to intrinsically retain at least a portion of the liquid, which in turn is not available for aerosolization before having left the retention. Using a liquid retention material reduces the risk of spill in case of failure or cracks of the aerosol-generating article due to the liquid aerosol-forming substrate being safely held in the retention material. Advantageously, this allows the aerosol-forming rod to be leak proof.

As used herein, cut tobacco material may comprise at least one shreds of tobacco lamina, reconstituted tobacco, shreds of tobacco ribs or shreds of tobacco stems. Likewise, cut botanical material may comprise at least one shreds of botanical lamina, shreds of botanical ribs or shreds of botanical stems.

As an example, at least one of the sleeve portion and the core portion may comprise a porous substrate, such as a porous reconstituted tobacco material. In addition, the porous substrate may comprise glycerin, guar, water, tobacco fibers, cellulose fibers, as well as flavorings and nicotine of natural or artificial origin. The porous substrate may be initially provided as a thin sheet material and finally formed into the cross-sectional shape of the sleeve portion or the core portion, as will be described below in detail with regard to the shaping device according to the present invention. Preferably, the sheet material is crimped or folded or both crimped and folded. The amount and density of the sheet material entering the shaping device may be chosen such as result in a sleeve portion or a core portion having a specific resistance to draw.

As another example, at least one of the sleeve portion and the core portion may comprise a porous foam produced from fibers and materials of natural origin, for example fibers and materials originating from botanicals or vegetables. The foam may comprise tobacco or tobacco material, or alternatively, may be free of tobacco. The porous foam may comprise nicotine in its original formulation. The porous foam may comprise, in particular may be impregnated or soaked with an aerosol-forming liquid. The aerosol-forming liquid may comprise at least one of nicotine and at least one flavoring substance.

As yet another example, at least one of the sleeve portion and the core portion may comprise cast leaf material that is crimped and gathered into the shape of the sleeve portion or the core portion, respectively.

As yet another example, the sleeve portion may comprise a low porosity material which comprises at least one of acetate tow expanded fibers, botanical expanded fibers and cellulose-based fibers. The fibers may be substantially oriented in one direction, in particular in a direction parallel to a longitudinal axis of the aerosol-forming rod. In the aerosol-forming rod, the fibers may be compressed, yet preferably only to at most 80 percent, in particular at most 90 percent of the volume of the fibers prior to forming the fibers into the aerosol-forming rod. In this low compression configuration, the sleeve portion has a low resistance to draw and substantially no filtration capabilities. As a result, the sleeve portion advantageously may be used to affect the airflow which is produced by a negative pressure applied to the aerosol-generating article and into which volatile compounds are released from the core portion. Preferably, in this configuration, the sleeve portion does not comprise any aerosol-forming substrate. In particular the sleeve portion does not comprise any tobacco or tobacco material. Accordingly, the aerosol formation is concentrated by the aerosol-forming substrate in the core portion. Nevertheless, the sleeve portion may comprise a flavoring substance which may be vaporized by the susceptor and entrained into the airflow.

With regard to an enhancement of the diversity of generatable aerosols, the second aerosol-forming substrate preferably is different from the first aerosol-forming substrate. The first aerosol-forming substrate and the second aerosol-forming substrate may differ from each other, for example in at least one of content, composition, flavor and texture. For example, the first aerosol-forming substrate may comprise crimped cast leaf and the second aerosol-forming substrate may comprise tobacco fibers in the form of a porous substrate or foam.

Likewise, the second flavoring material preferably is different from the first flavoring material. The first flavoring material and the second flavoring material may differ from each other, for example in at least one of content, composition, flavor and texture.

In general, a cross-section of the cylindrical core portion as seen in a plane perpendicular to a longitudinal axis of the aerosol-forming rod may have any shape. Preferably, the cylindrical core portion has a rectangular or quadratic cross-section. Preferably, these cross-sectional shapes have at least one substantially straight edge. Thus, the cylindrical core has a plane, in particular a flat surface which may be used as contact surface which the susceptor laterally abuts. Advantageously, this enhances the efficiency of the heat transfer from the susceptor to the core portion. This holds in particular in case the susceptor comprise a corresponding flat surface which abuts the flat surface of the core portion as counterpart.

The cylindrical core portion may also have a triangular or a star-shaped or an elliptical or an oval or a circular or a polygonal or a semi-oval or a semi-elliptical or semi-circular cross-section. In case the cross-section of the core portion comprises one or more curved edge portions which one of the first susceptor or the second susceptor abuts, the respective susceptor may also be curved in a direction perpendicular to a longitudinal axis of the aerosol-forming rod corresponding to the curved edge portion of cross-sectional shaped of the core portion in order to maximize the contact surface between the core portion and the respective susceptor.

It is preferred that the cross-section of the core portion is substantially constant along a longitudinal axis of the aerosol-forming rod within manufacturing tolerances. However, in some embodiment it may be preferable to have a discontinuous cylindrical core portion, in particular with a discontinuous susceptor. This in turn allows for cutting a continuously formed aerosol-forming rod strand—details of which are described below—into individual aerosol-forming rods without having to cut through the susceptor.

Preferably, the cylindrical core portion is strip-shaped. A strip-shaped core portion not only provides the benefits of a flat contact surface for the susceptor as described before, but also may be advantageous with regard to a simple manufacturing by a continuous rod forming process. As used herein, the term "strip-shaped core portion" refers to a cylindrical core portion which has a length extension and a width extension which are both larger than a thickness extension of the element. Preferably, the length extension is also larger than the width extension. In case of a strip-shaped core portion, the receptive susceptor preferably abuts a large side of the core portion. Advantageously, this enhances the heating efficiency. Preferably, a strip-shaped core portion has a rectangular cross-section. A strip-shaped core portion may also have a curved rectangular cross-section, wherein the large side of the respective susceptor is curved.

As used herein, the term "susceptor" refers to an element comprising a material that is capable of being inductively heated within an alternating electromagnetic field. This may be the result of at least one of hysteresis losses and eddy currents induced in the susceptor, depending on the electrical and magnetic properties of the susceptor material. Hysteresis losses occur in ferromagnetic or ferrimagnetic susceptors due to magnetic domains within the material being switched under the influence of an alternating electromagnetic field. Eddy currents may be induced if the susceptor is electrically conductive. In case of an electrically conductive ferromagnetic susceptor or an electrically conductive ferrimagnetic susceptor, heat can be generated due to both, eddy currents and hysteresis losses. Accordingly, the susceptor may comprise a material which is at least one of electrically conductive and magnetic.

The first susceptor and the second susceptor may be formed from any material that can be inductively heated to a temperature sufficient to generate an aerosol from the aerosol-forming substrate. Preferred susceptor comprise a metal or carbon. A preferred susceptor may comprise or consist of a ferromagnetic material, for example a ferromagnetic alloy, ferritic iron, or a ferromagnetic steel or stainless steel. Another suitable susceptor may comprise or consist of aluminum. Preferred susceptors may be heated to a temperature between about 40 degree Celsius and about 500 degree Celsius, in particular between about 50 degree Celsius and about 450 degree Celsius, preferably between about 100 degree Celsius and about 400 degree Celsius. The susceptor may also comprise a non-metallic core with a metal layer disposed on the non-metallic core, for example metallic tracks formed on a surface of a ceramic core.

At least one of the first susceptor and the second susceptor may comprise a protective external layer, for example a protective ceramic layer or protective glass layer encapsulating the respective susceptor. At least one of the first susceptor and the second susceptor may comprise a protective coating formed by a glass, a ceramic, or an inert metal, formed over a core of susceptor material.

At least one of the first susceptor and the second susceptor may be a multi-material susceptor. In particular, a respective multi-material susceptor may comprise a first susceptor material and a second susceptor material. The first susceptor material preferably is optimized with regard to heat loss and thus heating efficiency. For example, the first susceptor material may be aluminum, or a ferrous material such as a stainless steel. In contrast, the second susceptor material preferably is used as temperature marker. For this, the second susceptor material is chosen such as to have a Curie temperature corresponding to a predefined heating temperature of the susceptor assembly. At its Curie temperature, the magnetic properties of the second susceptor change from ferromagnetic to paramagnetic, accompanied by a temporary change of its electrical resistance. Thus, by monitoring a corresponding change of the electrical current absorbed by the induction source it can be detected when the second susceptor material has reached its Curie temperature and, thus, when the predefined heating temperature has been reached. The second susceptor material preferably has a Curie temperature that is below the ignition point of the aerosol-forming substrate, that is, preferably lower than 500 degree Celsius. Suitable materials for the second susceptor material may include nickel and certain nickel alloys. Nickel has a Curie temperature in the range of about 354 degree Celsius to 360 degree Celsius depending on the nature of impurities. A Curie temperature in this range is ideal because it is approximately the same as the temperature that the respective susceptor should be heated to in order to generate an aerosol from an aerosol-forming substrate, but still low enough to avoid local overheating or burning of the aerosol-forming substrate.

At least one of the first susceptor and the second susceptor may be in the form of a pin, a rod, a filament, or a strip. Preferably, the susceptor is a strip or strip-shaped. A susceptor strip or strip-shaped susceptor element may be advantageous as it can be easily manufactured at low costs.

At least one of the first susceptor and the second susceptor may be in the form of a pin, a rod, a filament, or a strip. Preferably, at least one of the first susceptor and the second susceptor is a strip or strip-shaped. A susceptor strip is advantageous as it can be easily manufactured at low costs.

As used herein, the terms "strip-shaped" and "strip" refer to an element which has a length extension and a width extension which are both larger than a thickness extension of the element. Preferably, the length extension is also larger than the width extension. In particular, a susceptor strip may be a susceptor blade, a susceptor plate, a susceptor sheet, a susceptor band, or a susceptor foil.

At least one of the first susceptor and the second susceptor may have a square or rectangular or semi-oval or semi-elliptical or semi-circular cross-section as seen in a plane perpendicular to a longitudinal axis of the aerosol-forming rod. Preferably, the cross-section of a respective susceptor has at least one edge portion which corresponds to an edge portion of the cross-section of the core portion which the respective susceptor may abut. Thus, a contact surface is realized between the respective susceptor and the core portion which is sufficiently large with regard to an enhanced heat transfer.

At least one of the first susceptor and the second susceptor may also have a triangular or a polygonal or an oval or an elliptical or a circular cross-section.

If at least one of the first susceptor and the second susceptor has the form of a strip, in particular a blade, a plate, a sheet, a band, or a foil, the respective susceptor preferably has a substantially rectangular cross-section. In this case, the respective susceptor preferably has a width dimension that is greater than a thickness dimension, for example greater than twice a thickness dimension. Advantageously, a respective strip-shaped susceptor has a width preferably between about 2 millimeter and about 8 millimeter, more preferably, between about 3 millimeter and about 5 millimeter, and a thickness preferably between about 0.03 millimeter and about 0.15 millimeter, more preferably between about 0.05 millimeter and about 0.09 millimeter. A length of the susceptor strip may be, for example, in a range of 8 millimeter to 16 millimeter, in particular, 10 millimeter to 14 millimeter, preferably 12 millimeter.

In case of a strip-shaped susceptor, the receptive susceptor preferably is arranged such that a large side of the susceptor abuts the core portion, in particular a large side of the core portion in case of strip-shaped core portion. Advantageous, this enhances the heating efficiency.

In case of a semi-circular cross-section, the susceptor preferably has a width or radius of between about 0.5 millimeter and about 2.5 millimeter.

Preferably, at least one of the first susceptor and the second susceptor is dimensionally stable. That means that the respective susceptor substantially remains undeformed during manufacturing of the aerosol-forming rod or that any deformation of the respective susceptor required to form the aerosol-forming rod remains elastic such that the respective susceptor returns to its intended shape when the deforming force is removed. For this, the shape and material of the respective susceptor may be chosen such as to ensure sufficient dimensional stability. Advantageously, this assures that the originally desired cross-sectional profile is preserved throughout the manufacturing of the aerosol-forming rod. A high dimensional stability reduces the variability of the product performance. With regard to the shaping device according to the present invention and as described in detail further below this means, that the shaping device is configured such that the receptive susceptor substantially remains undeformed after passing through the shaping device. This means that preferably any deformation of the respective susceptor required to form a continuous rod remains elastic such that the respective susceptor returns to its intended shape when the deforming force is removed.

At least one of the first susceptor and the second susceptor may have a constant cross-section along a longitudinal axis of the aerosol-forming rod. Alternatively, the cross-section of at least one of the first susceptor and the second susceptor may vary along a longitudinal axis of the aerosol-forming rod. For example, if at least one of the first susceptor and the second susceptor has the form of a strip, at least one of a width dimension and a thickness dimension of the respective susceptor may vary along a length axis of the aerosol-forming rod.

Preferably, a length dimension of at least one of the first susceptor and the second susceptor substantially corresponds to the length dimension of the aerosol-forming rod as measured along the longitudinal axis of the aerosol-forming rod. The length dimension of at least one of the first susceptor and the second susceptor may be, for example, in a range of 8 millimeter to 16 millimeter, in particular, 10 millimeter to 14 millimeter, preferably 12 millimeter. Moreover, the susceptor may have a length dimension equal to a length dimension of at least one of the core portion and the sleeve portion, thus leading to a heating of the core portion and the sleeve portion, respectively, along their length extension. However, as mentioned above, it may be advantageous to have at least one of a first interrupted susceptor and a second interrupted susceptor and, hence, at least one of a first susceptor and a second susceptor where the length dimension of the respective susceptor is smaller than the length dimension of the aerosol-forming rod.

At least one of the first susceptor and the second susceptor may comprise an expanded metal sheet comprising a plurality of openings through the sheet. As used herein, the term "expanded metal sheet" refers to a type of metal sheet in which a plurality of weakened areas, in particular a plurality of perforations have been created and which subsequently has been stretched to form a regular pattern of openings originating from stretching the plurality of weakened areas, in particular from the plurality of perforations.

Using a susceptor comprising an expanded metal sheet provides a plurality of advantages as compared to other types of sheet-like susceptors. First, the proportional rate between the total mass and the heat emission surface of a susceptor comprising an expanded metal sheet is improved as compared to a susceptor comprising a metal sheet without any openings. Advantageously, this helps to conserve resources for the manufacturing of the article. In addition, the reduced mass per unit area may also be beneficial with regard to a reduced total mass of the article. Second, the specific manufacturing process of expanded metal sheet does not involve a waste of material. Third, due to the openings, the susceptor of the article according to the present invention is permeable causing the airflow drawn through the article to be enhanced as compared to an article comprising a non-permeable susceptor. In addition, the openings of the susceptor facilitate the release and entrainment of the material that is volatilized from the heated aerosol-forming substrate into the airflow. Advantageously, both aspects facilitate aerosol formation. Fourth, the openings of the expanded metal sheet may get filled with aerosol-forming substrate during the manufacturing of the rod. Advantageously, this may support fixation of the susceptor within aerosol-forming rod. As a consequence, the positional accuracy and stability of the susceptor within the aerosol-forming rod is significantly improved.

As used herein, the term "openings" is to be understood as an opening which extends through the entire expanded sheet material along its thickness extension, from one plane side to the opposite plane side of the expanded sheet material. Likewise, the term "perforation" is to be understood as a perforation that extends through the entire sheet material along its thickness extension, from one plane side to the opposite plane side of the sheet material. The term "weakened area" refers to an area of the metal sheet which has a reduced material thickness in a direction perpendicular to the main surface of the metal sheet, that is, along a thickness extension of the metal. The reduction of the material thickness is such that upon stretching the weakened metal sheet the weakened area is transformed into an opening through the entire expanded sheet material along its thickness extension. Furthermore, the term "openings" may cover two types of openings, namely, openings having a closed boundary as well as openings having a partially open boundary. An opening having a closed boundary is completely bounded by the material of the expanded metal sheet along the perimeter of the opening. In contrast, an opening having a partially open boundary is only partially bounded by the material of the expanded metal sheet along the perimeter of the opening. If present, the one or more openings having a partially open boundary are located at a side edge of the expanded metal sheet. That is, such openings are laterally opened up towards a side edge of the expanded metal sheet. If present, the one or more openings having a partially open boundary may result from weakened areas, in particular perforations created in a metal sheet that extend beyond the side edge of the metal sheet and which are subsequently stretched. Accordingly, the expanded metal sheet may comprise one of: a plurality of openings having a closed boundary; a plurality of openings having a partially open boundary; or one or more openings having a closed boundary as well as one or more openings having a partially open boundary. The plurality of openings may be arranged in a periodic pattern, in particular a periodic offset pattern. In particular, in the offset arrangement, the plurality of openings may be arranged in a plurality of rows along a first direction, wherein each row extends in a second direction perpendicular to the first direction and comprises one or more openings, and wherein the one or more openings in one row are offset to the one or more openings in each neighboring row.

Preferably the first susceptor and the second susceptor as well as the core portion are strip-shaped. In particular, a large side of the receptive strip-shaped susceptor may abut a large side of the strip-shaped core portion. Advantageously, in this configuration, the cross-sectional shape of the core portion largely overlaps with the cross-sectional heating area of the respective strip-shaped susceptor, which makes heating of the core portion more efficient. Even more preferably, at least one of a width dimension and a length dimension of at least one of the first strip-shaped susceptor and the second strip-shaped susceptor is equal to a width dimension or a length dimension of the strip-shaped core portion, respectively. Such an arrangement may also be advantageous for an efficient heating of the core portion. It also is possible that at least one of a width dimension and a length dimension of at least one of the first strip-shaped susceptor and the second strip-shaped susceptor is smaller than a width dimension or a length dimension of the strip-shaped core portion, respectively. This may help to save susceptor material. Alternatively, it also is possible that at least one of a width dimension and a length dimension of at least one of the first strip-shaped susceptor and the second strip-shaped susceptor is larger than a width dimension or a length dimension of the strip-shaped core portion, respectively. This may help to increase the heating rate.

The core portion may be symmetrically arranged with respect to a longitudinal center axis of the aerosol-forming rod. That is, a longitudinal center axis of the cylindrical core is coaxially arranged with a longitudinal center axis of the aerosol-forming rod. Likewise, the first susceptor and the second susceptor may have the same dimensions and may be symmetrically arranged with respect to a longitudinal center axis of the aerosol-forming rod. Any of these arrangements may be advantageous with regard to a well-balanced mass distribution of the aerosol-forming rod.

The sleeve portion preferably surrounds the core portion, the first susceptor and the second susceptor along the entire circumference of the aerosol-forming rod. Likewise, the sleeve portion preferably is arranged along the entire length dimension of at least one of the core portion, the first susceptor and the second susceptor, preferably along the entire length dimension of all elements, the core portion, the first susceptor and the second susceptor. Thus, the sleeve portion may be uniformly heated by the susceptor.

In general, a cross-section of the sleeve portion as seen in a plane perpendicular to a longitudinal axis of the aerosol-forming rod may have any suitable shape. Preferably, the sleeve portion has a rectangular or quadratic or an elliptical or a circular cross-section or a triangular or other polygonal outer cross-section. The inner cross-section preferably is adapted to the outer cross-sectional profile of the assembly of the core portion, the first susceptor and the second susceptor, which both abut the core portion.

Preferably, the sleeve portion surrounds the first susceptor, the second susceptor and the core portion such as to form or fill out, in particular completely fill out the cylindrical shape of the aerosol-forming rod. Thus, the outer cross-section of the sleeve portion preferably defines an outer cross-sectional shape of the aerosol-forming rod.

Preferably, the aerosol-forming rod has a circular or elliptical or oval cross-section. However, the aerosol-forming rod may also have a square or rectangular or triangular or other polygonal cross-section. In particular, the outer cross-sectional shape of the sleeve portion may define an outer cross-sectional shape of the aerosol-forming rod.

According to the invention there is also provided an inductively heatable aerosol-generating article for use with an inductively heating aerosol-generating device, wherein the article comprises an aerosol-generating rod according to the present invention and as described herein.

As used herein, the term "aerosol-generating article" refers to an article comprising at least one aerosol-forming substrate to be used with an aerosol-generating device. The aerosol-generating article may be a intended for single use. The aerosol-generating article may be a tobacco article. In particular, the article may be a rod-shaped article resembling cigarettes.

In addition to the aerosol-forming rod, the article may further comprise different elements: a support element having a central air passage, an aerosol-cooling element, and a filter element. Any one or any combination of these elements may be arranged sequentially to the aerosol-forming rod segment. Preferably, the aerosol-forming rod is arranged at a distal end of the article. Likewise, the filter element preferably is arranged at a proximal end of the article. Furthermore, these elements may have the same outer cross-section as the aerosol-forming rod segment.

The filter element preferably serves as a mouthpiece, or as part of a mouthpiece together with the aerosol-cooling element. As used herein, the term "mouthpiece" refers to a portion of the article through which the aerosol exits the aerosol-generating article. The filter element preferably has an external diameter that is approximately equal to the external diameter of the aerosol-generating article. The filter element may have an external diameter of between 5 millimeter and 10 millimeter, for example of between 6 millimeter and 8 millimeter. In a preferred embodiment, the filter element has an external diameter of 7.2 millimeter plus or minus 10 percent, preferably plus or minus 5 percent. The filter element may have a length of between 5 millimeter and 25 millimeter, preferably a length of between 10 millimeter and 17 millimeter. In a preferred embodiment, the filter element has a length of 12 millimeter or 14 millimeter. In another preferred embodiment, the filter element has a length of 7 millimeter.

The support element may be located immediately downstream of the aerosol-forming rod. The support element may abut the aerosol-forming rod. The support element may be formed from any suitable material or combination of materials. For example, the support element may be formed from one or more materials selected from the group consisting of: cellulose acetate; cardboard; crimped paper, such as crimped heat resistant paper or crimped parchment paper; and polymeric materials, such as low density polyethylene (LDPE). In a preferred embodiment, the support element is formed from cellulose acetate. The support element may comprise a hollow tubular element. In a preferred embodiment, the support element comprises a hollow cellulose acetate tube.

The support element preferably has an external diameter that is approximately equal to the external diameter of the aerosol-generating article. The support element may have an external diameter of between 5 millimeter and 12 millimeter, for example of between 5 millimeter and 10 millimeter or of between 6 millimeter and 8 millimeter. In a preferred embodiment, the support element has an external diameter of 7.2 millimeter plus or minus 10 percent, preferably plus or minus 5 percent. The support element may have a length of between 5 millimeter and 15 millimeter, in particular between 6 millimeter and 12 millimeter. In a preferred embodiment, the support element has a length of 8 millimeter. The aerosol-cooling element may be located downstream of the aerosol-forming substrate element, for example immediately downstream of a support element, and may abut the support element.

The aerosol-cooling element may be located between the support element and a filter element located at the extreme downstream end of the aerosol-generating article.

As used herein, the term "“aerosol-cooling element” is used to describe an element having a large surface area and a low resistance to draw, for example 15 mmWG to 20 mmWG. In use, an aerosol formed by volatile compounds released from the aerosol-forming rods is drawn through the aerosol-cooling element before being transported to the mouth end of the aerosol-generating article.

The aerosol-cooling element preferably has a porosity in a longitudinal direction of greater than 50 percent. The airflow path through the aerosol-cooling element is preferably relatively uninhibited. The aerosol-cooling element may be a gathered sheet or a crimped and gathered sheet. The aerosol-cooling element may comprise a sheet material selected from the group consisting of polyethylene (PE), polypropylene (PP), polyvinylchloride (PVC), polyethylene terephthalate (PET), polylactic acid (PLA), cellulose acetate (CA), and aluminum foil or combinations thereof.

In a preferred embodiment, the aerosol-cooling element comprises a gathered sheet of biodegradable material. For example, a gathered sheet of non-porous paper or a gathered sheet of biodegradable polymeric material, such as for example polylactic acid or a grade of Mater-Bi<®> (a commercially available family of starch based copolyesters).

The aerosol-cooling element preferably comprises a sheet of PLA, more preferably a crimped, gathered sheet of PLA. The aerosol-cooling element may be formed from a sheet having a thickness of between 10 micrometer and 250 micrometer, in particular between 40 micrometer and 80 micrometer, for example 50 micrometer. The aerosol-cooling element may be formed from a gathered sheet having a width of between 150 millimeter and 250 millimeter. The aerosol-cooling element may have a specific surface area of between 300 square millimeter per millimeter length and 1000 square millimeter per millimeter length between 10 square millimeter per mg weight and 100 square millimeter per milligram weight. In some embodiments, the aerosol-cooling element may be formed from a gathered sheet of material having a specific surface area of about 35 square millimeter per milligram weight. The aerosol-cooling element may have an external diameter of between 5 millimeter and 10 millimeter, for example 7 millimeter.

In some preferred embodiments, the length of the aerosol-cooling element is between 10 millimeter and 15 millimeter. Preferably, the length of the aerosol-cooling element is between 10 millimeter and 14 millimeter, for example 13 millimeter. In alternative embodiments, the length of the aerosol-cooling element is between 15 millimeter and 25 millimeter. Preferably, the length of the aerosol-cooling element is between 16 millimeter and 20 millimeter, for example 18 millimeter.

The article may further comprise a wrapper surrounding at least a portion of the different elements mentioned above such as to keep them together and to maintain the desired cross-sectional shape of the article. Preferably, the wrapper forms at least a portion of the outer surface of the article. For example, the wrapper may be a paper wrapper, in particular a paper wrapper made of cigarette paper. Alternatively, the wrapper may be a foil, for example made of plastics. The wrapper may be fluid permeable such as to allow vaporized aerosol-forming substrate to be released from the article. A fluid permeable wrapper may also allow air to be drawn into the article through its circumference. Furthermore, the wrapper may comprise at least one volatile substance to be activated and released from the wrapper upon heating. For example, the wrapper may be impregnated with a volatile flavoring substance.

Preferably, the inductively heatable aerosol-generating article according to present invention has a circular or elliptical or oval cross-section. However, the article may also have a square or rectangular or triangular or other polygonal cross-section.

Further features and advantages of the aerosol-generating article according to the present invention have been described with regard to aerosol-forming rod and equally apply.

The present invention further relates to an aerosol-generating system comprising an inductively heatable aerosol-generating article according to the invention and as described herein. The system further comprises an inductively heating aerosol-generating device for use with the article. The aerosol-generating device comprises a receiving cavity for receiving the article at least partially in the receiving cavity. The aerosol-generating device further comprise an induction source including at least one induction coil for generating an alternating, in particular high-frequency electromagnetic field within the receiving cavity such as to inductively heat the susceptor of the article when the article is received in the receiving cavity. The at least one induction coil may be a helical induction coil which is arranged coaxially around the cylindrical receiving cavity.

The device may further comprise a power supply and a controller for powering and controlling the heating process. As referred to herein, the alternating, in particular high-frequency electromagnetic field may be in the range between 500 kHz to 30 MHz, in particular between 5 MHz to 15 MHz, preferably between 5 MHz and 10 MHz.

The aerosol-generating device may be, for example a device as described in WO 2015/177256 A1.

In use, the aerosol-generating article engages with the aerosol-generating device such that the susceptor assembly is located within the fluctuating electromagnetic field generated by the inductor.

Further features and advantages of the aerosol-generating system according to the present invention have been described with regard to aerosol-generating article and partially in the receiving cavity.

According to the invention there is also provided a shaping device for usage in the manufacturing of inductively heatable aerosol-forming rods according to the present invention and as described herein. The shaping device comprises:

- a core-forming device configured for gathering a core material comprising at least one of the first aerosol-forming substrate and the first flavoring material into a continuous core strand such that upon passing through the core-forming device the continuous core strand has a cross-sectional shape corresponding to a cross-sectional shape of the cylindrical core portion;
- a first longitudinal guide for arranging a first continuous susceptor profile relative to the continuous core strand such that upon passing through the core-forming device the first continuous susceptor profile laterally abuts the continuous core strand at a first side, wherein the first longitudinal guide extends downstream at least into an upstream section of the core-forming device;

a second longitudinal guide for arranging a second continuous susceptor profile relative to the continuous core strand such that upon passing through the core-forming device the second continuous susceptor profile laterally abuts the continuous core strand at a second side opposite to the first side, wherein the second longitudinal guide extends downstream at least into an upstream section of the core-forming device;

a sleeve-forming device arranged around at least a downstream section of the core-forming device and configured for gathering a sleeve material comprising at least one of the filler material, the second aerosol-forming substrate and the second flavoring material into a continuous sleeve strand around the continuous core strand, the first continuous susceptor profile and the second continuous susceptor profile such that upon passing through the sleeve-forming device the continuous sleeve strand has a cross-sectional shape corresponding to a cross-sectional shape of the sleeve portion.

Advantageously, the shaping device allows for an efficient assembly of the different components of the aerosol-forming rod into the desired geometry of the aerosol-forming rod to be manufactured. In particular, the shaping device enables to ensure an accurate arrangement of each component in terms of position and shape within the respective tolerances.

For gathering the core material into continuous core strand, the core-forming device preferably comprises an inner funnel. As to this, the core-forming device may comprise a substantially tubular body. The substantially tubular body may comprise at least one converging section, in particular at least one conically converging section. Preferably, the at least one converging section is at an upstream end of the core-forming device. With regard to a longitudinal center axis of the shaping device, an axial length of the at least one converging section may be at least 10 percent, in particular at least 20 percent, preferably at least 30 percent of an axial length of the core-forming device. A shape of an inner cross-section, in particular of an inner cross-section of a downstream section of the core-forming device preferably corresponds to the cross-sectional shape of the cylindrical core portion. Preferably, gathering occurs in a transverse direction with respect of a direction of travel of the core material though the core-forming device. Depending on the radial position of the core portion in the aerosol-forming rod, a center axis of the inner funnel may be coaxial to a longitudinal center axis of the shaping device according to the present invention.

The first longitudinal guide and the second longitudinal guide advantageously facilitate to achieve a position of the first susceptor profile and the second susceptor profile corresponding to their respective pre-defined position in the final aerosol-forming rod. In addition, the first longitudinal guide and the second longitudinal guide are also favorable in view of keeping the respective susceptor profile dimensionally stable upon passing through the shaping device, in particular the core-forming device. Even more preferably, the first longitudinal guide and the second longitudinal guide may be used to initially separate the first susceptor profile and the second susceptor profile from the core material in an upstream end of the core-forming device.

At least of the first longitudinal guide and the second longitudinal guide may comprise a guiding rail or guiding support having a flat guiding surface for guiding the respective continuous susceptor profile. This may be advantageous in particular where the respective continuous susceptor profile is strip-shaped. Alternatively, at least one of the first longitudinal guide and the second longitudinal guide may comprise a guiding tube. Preferably, the guiding tube has an inner cross-sectional profile which substantially corresponds to an outer cross-sectional profile of the respective susceptor profile. This may be particularly advantageous with regard to a proper guiding of the respective susceptor profile.

Preferably, the first longitudinal guide and the second longitudinal guide are at least partially, preferably completely, realized by a common guiding tube extending downstream at least into the upstream section of the core-forming device. As to this, the common guiding tube may comprise a first guiding surface and a second guiding surface, located at opposite sides of the common guiding tube on its outer circumferential surface. The first guiding surface and the second guiding surface are configured for guiding the first susceptor profile and the second susceptor profile, respectively, at the outer circumferential surface of the common guiding tube along its length axis. In this configuration, the inner void of the common guiding tube may be configured for passing and guiding the core material therethrough. This setup may be particularly advantageous with regard to a compact design of the shaping device. The common guiding tube may also serve as part of the core-forming device for pre-gathering the core material. Preferably, the inner cross-sectional shape of the common tube corresponds to the shape of the core portion. Preferably, each one the first guiding surface and the second guiding surface on the outer circumference of the common guiding tube is a flat guiding surface, which may be advantageous in particular in case the respective continuous susceptor profile is strip-shaped. The outer cross-sectional shape of the common guiding tube preferably is rectangular or quadratic.

According to the invention, the first longitudinal guide and the second longitudinal guide extend downstream at least into an upstream section of the core-forming device. Advantageously, this may allow for additionally guiding the first susceptor profile and the second susceptor profile in a direction perpendicular to direction of travel though the shaping device other than the longitudinal guide. As used herein, the term "upstream section of the core-forming device" refers to a first stage of the core-forming device in which the core material is at least partially gathered but has not yet achieved the final shape. In particular, upon passing the upstream section of the core-forming device, the core material is at least partially gathered in a loose arrangement. In this context, "loose" indicates that the core material has, at that point, not yet been gathered into the final, more condensed form. The at least partially gathered core material may be of any form or shape, in particular of a rod shape, however with a lower density (or larger diameter) than in the final rod shape after having entirely passed the core-forming device.

In particular, at least one of the first longitudinal guide and the second longitudinal guide and the upstream section of the core-forming device may define a respective guiding channel or a guiding tube the susceptor profile may pass through. As described above, the guiding channel or tube preferably has an inner cross-sectional profile which substantially corresponds to an outer cross-sectional profile of the respective susceptor profile. This may be particularly advantageous with regard to a proper guiding of the respective susceptor profile.

Preferably, at least one of the first susceptor profile and the second susceptor profile is unguided at a downstream end of the upstream section or further downstream of the upstream section of the core-forming device. It might be also possible that the longitudinal guide extends further downstream of the upstream section of the core-forming device.

Accordingly, at least one of the first longitudinal guide and the second longitudinal guide may be configured for guiding the respective susceptor profile at least along 25 percent, in particular at least along 50 percent, preferably at least along 75 percent, more preferably at least along 90 percent or along 100 percent of a length of the core-forming device. For this, at least one of the first longitudinal guide and the second longitudinal guide may extend at least along 25 percent, in particular at least along 50 percent, preferably at least along 75 percent, more preferably at least along 90 percent or along 100 percent of a length of the core-forming device. Preferably, an upstream end of at least one of the first longitudinal guide and the second longitudinal guide is positioned upstream of an upstream end of the core-forming device. This ensures that the respective susceptor profile is accurately pre-positioned at its desired final position within the aerosol-forming rod prior to entering the core-forming device, that is, upstream of the core-forming device.

Likewise, the core-forming device may extend downstream at least into an upstream section of the sleeve-forming device. Advantageously, this ensures the proper arrangement of the core material at the pre-defined position in the final aerosol-forming rod.

As used herein, the term “upstream section of the sleeve-forming device” refers to a first stage of the sleeve-forming device in which the sleeve material is at least partially gathered but has not yet achieved the final shape. In particular, upon passing the upstream section of the sleeve-forming device, the sleeve material is at least partially gathered in a loose arrangement. In this context, “loose” indicates that the sleeve material has, at that point, not yet been gathered into the final, more condensed form. The at least partially gathered sleeve material may be of any form or shape, in particular of a rod shape, however with a lower density (or larger diameter) than in the final rod shape after having entirely passed the sleeve-forming device.

As described above with regard to the first longitudinal guide and the second longitudinal guide, the core-forming device may extend at least along 25 percent, in particular at least along 50 percent, preferably at least along 75 percent, more preferably at least along 90 percent or along 100 percent of a length of the sleeve-forming device. An upstream end of the core-forming device may be positioned at or upstream of an upstream end of the sleeve-forming device.

For adjusting a position of at least one of the first longitudinal guide and the second longitudinal guide relative to the core-forming device at least in one direction, the shaping device may comprise a first translation stage. Preferably, the first translation stage is configured to adjust at least an axial position of at least one of the first longitudinal guide and the second longitudinal guide relative to the core-forming device. As used herein, the term “axial” refers to a direction of travel of the susceptor profile, the core material and the sleeve material through the shaping device, in particular to a longitudinal center axis of the shaping device. In particular in case, where at least one of the first longitudinal guide and the second longitudinal guide is configured to initially separate the respective susceptor profile from the core material at an upstream section of the core-forming device, adjustability of the axial position of the respective longitudinal guide relative to the core-forming device enables to adjust the axial position at which the respective susceptor profile and the core material come together. In addition or alternatively, the first translation may also be configured to adjust the position of at least one of the first longitudinal guide and the second longitudinal guide relative to the core forming device in at least one, in particular two lateral directions perpendicular to the axial direction. The two lateral directions preferably are perpendicular to each other.

The first translation stage may be configured to simultaneously adjust both in one, the position of the first longitudinal guide and the position of the second longitudinal guide, relative to the core-forming device. In particular, the position of the first longitudinal guide and the position of the second longitudinal guide may be coupled to each other and thus adjustable only together. Alternatively, the shaping device may comprises two separate first translations stages, one for each of the first longitudinal guide and the second longitudinal guide, to adjust their respective positon relative to the core-forming device separately.

For adjusting a position of the core-forming device relative to the sleeve-forming device, the shaping device may comprise a second translation stage. Preferably, the second translation stage is configured to adjust a position of the core-forming device relative to the sleeve-forming device in at least one direction, in particular in at least one lateral direction, preferably in at least two lateral directions. The two lateral directions preferably are perpendicular to each other. As used herein, the term “lateral” refers to a direction perpendicular to a direction of travel of the susceptor profile, the core material and the sleeve material through the shaping device, in particular to a longitudinal center axis of the shaping device. In addition or alternatively, the second translation stage may also be configured to adjust an axial position of the core-forming device relative to the sleeve-forming device, that is, in a direction parallel to the direction of travel, in particular to a longitudinal center axis of the shaping device.

The first translation stage and the second translation stage may be part of a translation stage system of the shaping device.

For gathering the sleeve material into the continuous sleeve strand around the continuous core strand and the continuous susceptor, the sleeve-forming device may comprise an outer funnel. The outer funnel may be arranged around at least a downstream section of the core-forming device, that is, a section of the core-forming device downstream of an upstream section of the core-forming device, as defined further above.

The shaping device may further comprise one or more guiding fins arranged at an inner surface of the sleeve-forming device, in particular at an inner surface of the outer funnel. Alternatively or in addition, the shaping device may comprise one or more guiding fins arranged at an outer surface of the core-forming device, in particular at an outer surface of the inner funnel. These guiding fins are configured to guide the sleeve material towards the downstream end of the sleeve-forming device. Advantageously, the guiding fins may help to reduce undesired heating of the sleeve-forming device and the core-forming device during the sleeve-forming process that may occur due to friction between the sleeve material and the inner surface of the sleeve-forming device and outer surface of the core-forming device, respectively.

Preferably, the one or more guiding fins are helically twisted with regard to a direction of travel of the sleeve material through the shaping device. In particular, the one or more guiding fins may extend, preferably helically extend along the entire length dimension of the core-forming device or the sleeve-forming device, respectively. As seen in a cross-section perpendicular to a longitudinal axis of the shaping device, the one or more guiding fins may have a triangular cross-section or a semi-oval or semi-elliptical cross-section. In the latter two configurations, a semi-major axis of the semi-oval or semi-elliptical cross-section preferably is arranged perpendicular with respect to a longitudinal axis of the shaping device, in particular sustainably radially with respect to a longitudinal center axis of the shaping. The cross-section of the one or more guiding fins may vary, in particular in size. For example, the cross-section of the one or more guiding fins may decrease along a direction of travel of the sleeve material through shaping device. Likewise, a height of the one or more guiding fins, that is, an extension of the one or more fins in a radial direction with respect, to a longitudinal center axis of the shaping device, may vary, in particular may decrease along a direction of travel of the sleeve material through the shaping device.

The one or more guiding fins may be interrupted along the length extension, that is, substantially along a direction of travel of the sleeve material through the shaping device.

In particular, two or more guiding fins may be circumferentially arranged at an inner surface of the sleeve-forming device. Likewise, two or more guiding fins may be circumferentially arranged at an outer surface of the core-forming device.

The one or more guiding fins at an inner surface of the sleeve-forming device and the one or more guiding fins at an outer surface of the core-forming device may be arranged at different circumferential positions. In particular, the circumferential positions of the one or more guiding fins at the inner surface of the sleeve-forming device and the one or more guiding fins at the outer surface of the core-forming device may be shifted by a certain angle of rotation with respect to the longitudinal center axis of the shaping device, for example by 30 degree or 60 degree or 90 degree or 120 degree. In particular, a guiding fin at the outer surface of the core-forming device may be arranged at a circumferential position that is between, in particular centrally between the circumferential positions of two neighboring fins at an inner surface of the sleeve-forming device.

Alternatively or in addition to the one or more guiding fins, the sleeve-forming device may comprise at least one of one or more cooling ribs at an outer surface of the sleeve-forming device, and one or more cooling openings in a wall of the sleeve-forming device. Advantageously, the one or more cooling ribs or the one or more cooling openings may help to reduce undesired heating of the sleeve-forming device during the sleeve-forming process that may occur due to friction between the sleeve material and the inner surface of the sleeve-forming device.

The shaping device may be part an overall manufacturing device for manufacturing aerosol-forming rods, in particular aerosol-forming rod according to the present invention.

Accordingly, the present invention further provides a manufacturing device for manufacturing aerosol-forming rods, in particular aerosol-forming rod according to the present invention, wherein the manufacturing device comprises a shaping device according to the present invention and as described herein.

Downstream of the shaping device, the manufacturing device may further comprise a rod-forming device for finalizing, in particular forming the entity of the continuous first core strand, the second core strand, the susceptor profile and the continuous sleeve strand into a continuous aerosol-forming rod strand. The rod-forming device may comprise a garniture tape in the form of a continuous conveyor belt. The garniture tape preferably interacts with the at least one semi-funnel to form the final rod shape, and preferably to provide a wrapper around the entity of the continuous core strand, the susceptor profile and the continuous sleeve strand. Preferably, the garniture tape is arranged below a center axis of the rod-forming device, whereas the at least one semi-funnel is arranged above the center axis and thus above the garniture tape.

The garniture tape may support a wrapper. The wrapper may be supplied by a wrapper supply into an upstream end of the rod-forming device. The wrapper supply may for example include a wrapper bobbin. Preferably, the wrapper is supported on a surface of the garniture tape which faces the center axis. Thus, in operation the wrapper is automatically wrapped around the continuous sleeve strand. The wrapper supply may also add glue to at least a portion of the wrapper for keeping the wrapper around the sleeve portion.

At its downstream end, the rod-forming device provides a continuous aerosol-forming rod strand having the final rod-shape, preferably entirely surround by a wrapper.

Downstream of the rod-forming device, the manufacturing device may further comprise a cutting device for cutting the continuous aerosol-forming rod strand into individual inductively heatable aerosol-forming rods according to the present invention and as described herein.

The manufacturing device may comprise a first susceptor supply and a second susceptor supply configured for supplying the first susceptor profile and the second susceptor profile to the guiding device, respectively. The susceptor supply may comprise a first unwinding unit and a second unwinding unit for unwinding the first susceptor profile and the second susceptor profile provided on a bobbin, respectively.

The manufacturing device further may comprise a sleeve material supply configured for supplying the sleeve material to the sleeve-forming device. The sleeve material supply may comprise an unwinding unit for unwinding the sleeve material provided on a bobbin.

The manufacturing device further may comprise a core material supply configured for supplying the core material to the core-forming device. The core material supply may comprise an unwinding unit for unwinding the core material provided on a bobbin.

Downstream of at least one of the sleeve material supply, the susceptor supply and the core material supply, the manufacturing device may further comprise one or more treatment units for pre-treating the sleeve material, the first susceptor profile, the second susceptor profile and the core material, respectively. The one or more treatment units may be configured for physical treatment of the sleeve material, the first susceptor profile, the second susceptor profile and the core material, respectively. For example, a treatment unit may be configured for crimping the sleeve or core material, in particular, the sleeve or core material comprises a cast leaf material or an acetate tow. Alternatively or additionally, physical treatment of the sleeve or core material may comprise one or more of an ionizing treatment, a corona treatment, a pre-heating of the sleeve or core material.

A treatment unit for the first susceptor or the second susceptor profile, respectively, may be configured to create a plurality of perforations in the respective susceptor profile and to stretch the perforated susceptor profile at least along a first direction such as to create a respective expanded susceptor profile which comprises a plurality of openings originating from the plurality of perforations.

The manufacturing device may further comprise a tensioning unit for adjusting the tension of the sleeve material and the core material, respectively.

The manufacturing device may further comprise a dispensing unit for applying at least one of fluids, granules, particles and powders to the sleeve material and the core material, respectively.

The manufacturing device may further comprise a respective buffer unit for buffering the sleeve material and the core material, respectively.

In particular, the manufacturing device may comprise at least one of a treatment unit, a tensioning unit, a dispensing unit, and a buffer for each one of the sleeve material and the core material.

Further features and advantages of the device according to the invention have been described with regard to aerosol-forming rod and the aerosol-generating article and equally apply.

The invention will be further described, by way of example only, with reference to the accompanying drawings, in which.

Figure 1:
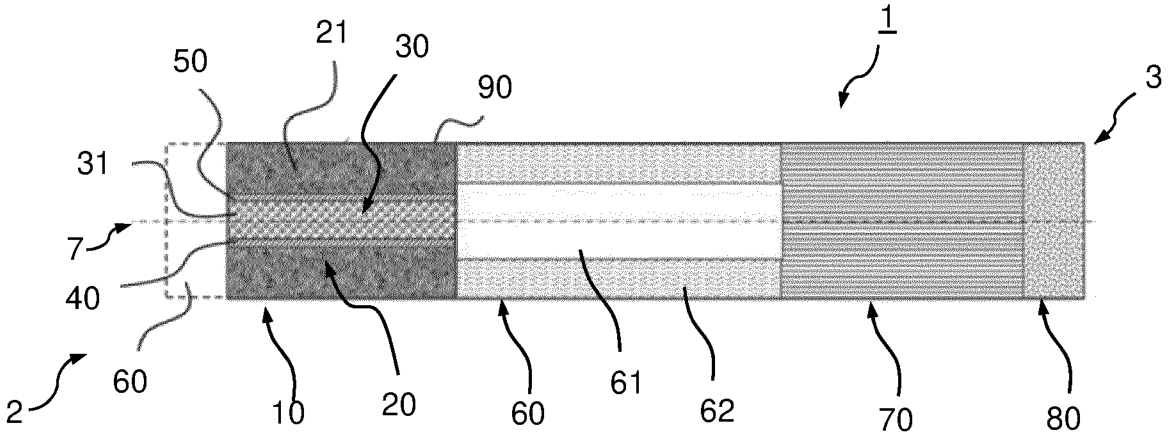
FIG. 1 is a schematic illustration of an inductively heatable aerosol-generating article comprising an inductively heatable aerosol-forming rod according an exemplary embodiment of the present invention.
Figure 5:
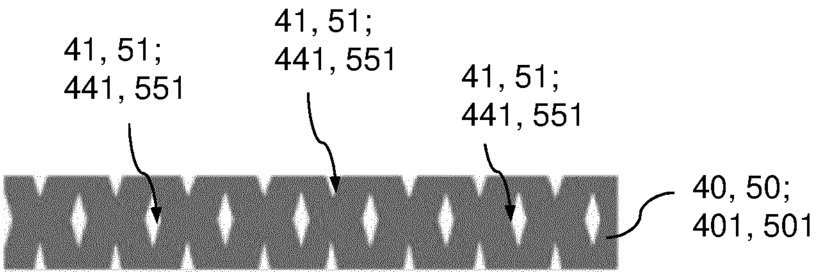
Figure 3:
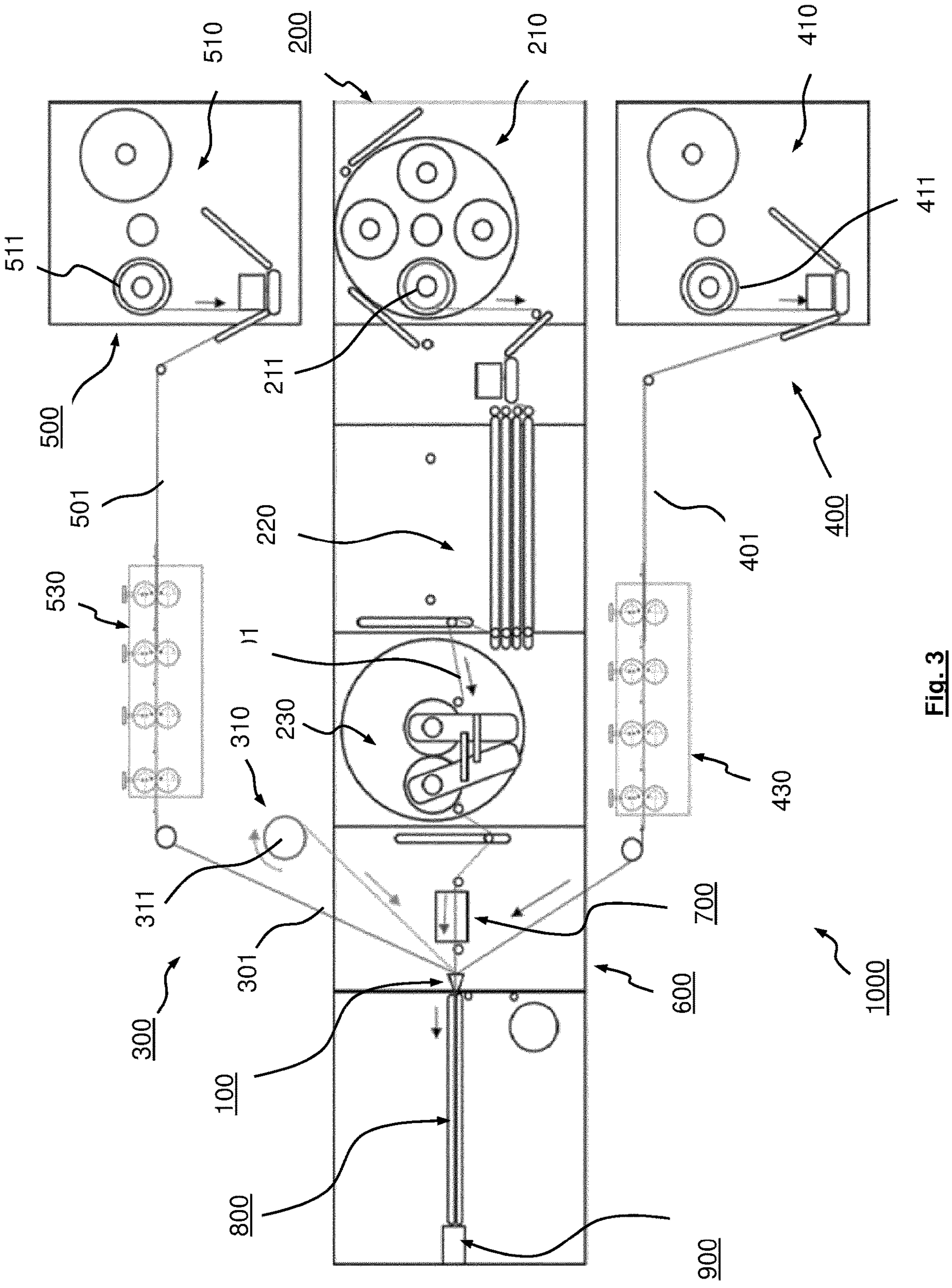
Figure 4:
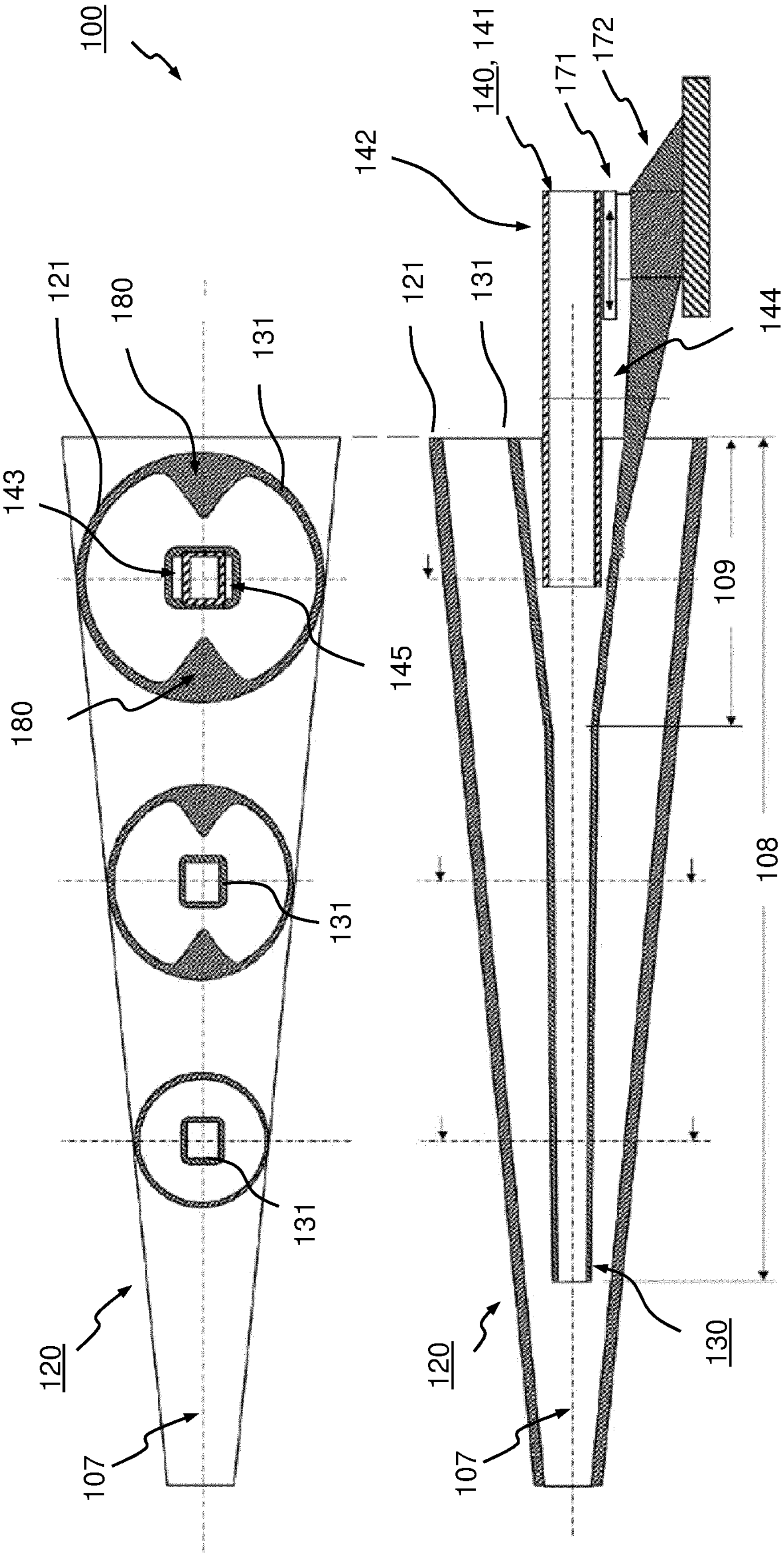

FIG. 3 schematically illustrates the manufacturing of inductively heatable aerosol-forming rods according to the present invention;

FIG. 4 is a schematic illustration of a shaping device for usage in the manufacturing of inductively heatable aerosol-forming rods according to FIG. 3; and FIG. 5 details of an example of a first and a second susceptor of the aerosol-forming rod according to FIG. 1.

Figure 2:
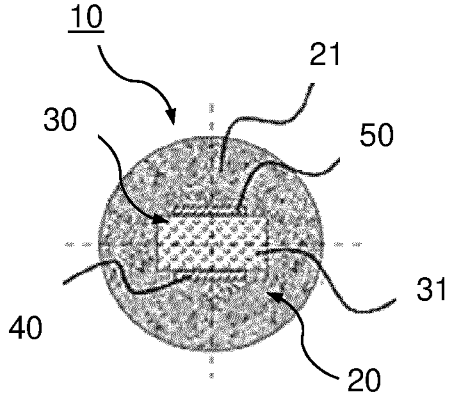
FIG. 2 is a cross-sectional view of the article according to FIG. 1.

FIG. 1 and FIG. 2 schematically illustrate an exemplary embodiment of an inductively heatable aerosol-generating article according to the present invention. The article 1 substantially has a rod-shape and comprises four elements which are arranged in coaxial alignment along the longitudinal axis 7 of the article 1: an aerosol-forming rod 10 according to the present invention, a support element 60, an aerosol-cooling element 70, and a filter element 80. The aerosol-forming rod 10 is arranged at a distal end 2 of the article 1, whereas the filter element 80 is arranged at a distal end 3 of the article 1. Optionally, the article 1 may further comprise a distal front-element 60 which may be used to cover and protect the distal front end of the aerosol-forming rod 10. Each of the aforementioned elements is substantially cylindrical, all of them having substantially the same diameter. In addition, the elements are circumscribed by an outer wrapper 90 such as to keep the elements together and to maintain the desired circular cross-sectional shape of the rod-shaped article 1. Preferably, the wrapper 90 is made of paper.

The rod-shaped aerosol-generating article 1 may have a length between 30 millimeter and 110 millimeter, preferably between 40 millimeter and 60 millimeter. Likewise, the article 1 may have a diameter between 3 millimeter and 10 millimeter, preferably between 5.5 millimeter and 8 millimeter.

The support element 60 may comprise a cartoon- or cellulose-based tube 62 having a central air passage 61 which allows for mixing and homogenization of any aerosols generated inside the aerosol-forming rod 10. Alternatively, the support element 60 may be used for keeping separate different aerosols generated at different places inside the aerosol-forming rod separate until reaching the aerosol-cooling element 70.

The aerosol-cooling element 70 mainly serves to reduce the aerosol temperature towards the proximal end 3 of the article 1. The aerosol-forming element may, for example, comprise biodegradable polymeric materials, cellulose-based materials with low porosity or combinations of these and other materials.

The filter element 80 may comprise standard filter materials, for example low density acetate tow.

Either the filter element 80 alone or both, the aerosol-cooling element 70 and the filter element 80 may serve as mouthpiece through which the aerosol exits the aerosol-generating article 1.

In the embodiment shown in FIG. 1 and FIG. 2, the aerosol-forming rod segment 10 has a cylindrical shape with a constant cross-section, for example circular cross-section. As part of the article 1, the aerosol-forming rod 10 may have a length between 5 millimeter and 20 millimeter, preferably between 7 millimeter and 13 millimeter. The diameter of the aerosol-forming rod 10 may be in a range between 3 millimeter and 10 millimeter, preferably between 5.5 millimeter and 8 millimeter.

As shown in FIG. 1 and FIG. 2, the aerosol-forming rod comprises at least four components: a cylindrical core portion 30 which includes at least one of a first aerosol-forming substrate and a first flavoring material, a first elongate susceptor and a second elongate susceptor 50 which laterally abut the cylindrical core portion 30 along a longitudinal axis 7 of the rod 10 at opposite sides, and a sleeve portion 20 which is arranged around the core portion 30, the first susceptor 40 and the second susceptor 50, and which comprises at least one of a filler material, a second aerosol-forming substrate 21 and a second flavoring material.

In the present embodiment, the core portion 30 comprises a liquid retention material 31 which is impregnated with a liquid (first) flavoring material. In contrast, the sleeve portion 20 comprises a filler comprising a cut tobacco material, wherein the cut tobacco material at least partially forms the second aerosol-forming substrate 21. In addition, the filler may be impregnated with a liquid aerosol-forming substrate. The susceptor 40 is an elongate strip made of ferromagnetic stainless steel. This material may be advantageous as it provides heat due to both, eddy currents and hysteresis losses. Optionally, the susceptor 40 may comprise a nickel coating, wherein nickel mainly serves as temperature marker as described further above. In addition, the susceptor 40 may comprises a protective coating to prevent undesired aging of the susceptor 40, for example, due to corrosion in the moist environment of the aerosol-forming substrates and flavoring materials.

As can be further seen in FIG. 1 and FIG. 2, the first susceptor 40 and the second susceptor 50 according to the present embodiment are strip-shaped, each having a width dimension in a range between 3.5 millimeter and 8 millimeter, preferably between 4 millimeter and 6 millimeter, and a thickness dimension in a range between 0.05 millimeter and 0.4 millimeter, preferably between 0.15 millimeter and 0.35 millimeter. In particular, one or both susceptors 40, 50 may be made of an expanded metal sheet comprising a plurality of openings 41, 51 through the sheet. An example of such susceptors 40, 50 is shown in FIG. 5.

The core portion 30 is also strip-shaped, having a width dimension in a range between 3.5 millimeter and 8 millimeter, preferably between 4 millimeter and 6 millimeter, and a thickness dimension in a range between 0.5 millimeter and 7 millimeter, preferably between 2 millimeter and 5 millimeter. As can be further seen in FIG. 1 and FIG. 12, a respective large side of each susceptor 40, 50 laterally abuts a respective large side of the core portion 11. Thus, the first susceptor 40 and the second susceptor 50 are in direct physical contact with the core portion 30. Advantageously, this arrangement allows for very efficient heating of the core portion 30. In particular, the heating profiles of both susceptors 40, 50 add up due to the overlap within a common heating zone between the susceptors 40, 50. In the common heating zone, the temperature is higher than in the respective non-overlapping parts of the heating profiles of the first susceptor 40 and the second susceptor 50. The respective non-overlapping parts of the heating profiles of the first susceptor 40 and the second susceptor 50 form a first heating zone and a second heating zone, in particular for heating the cut tobacco material (and optionally the liquid aerosol-forming substrate) in the sleeve portion 20. Advantageously, the different heating zones may be beneficially used to design a large variety of different aerosols by providing different aerosols or flavors in different quantities from the different portions 30, 20 of the aerosol-forming rod 10.

The respective contact between the core portion 30 and the first susceptor 40 and the second susceptor 50, respectively, is of a non-bonded nature, that is, the susceptors 40, 50 and the core portion 30 are not fixedly attached to each other. Nevertheless, the respective contact between the core portion 30 and the first susceptor 40 and the second susceptor 50, respectively, may include some kind of non-permanent adhesion, for example, due to wet or moist nature of the liquid retention material that is impregnated with liquid flavoring material.

The sleeve portion 20 is arranged around the core portion 30, the first susceptor 40 and the second susceptor 50 such that the cut tobacco material of the sleeve portion 20 completely fills the entire residual volume of the cylindrical rod 10. In particular, the cut tobacco material is in physical contact with the strip-shaped susceptors 40, 50, basically with a respective large side of each susceptor 40, 50 opposite to the respective large side which abuts the core portion 30. Thus, the cut tobacco material may be simultaneously heated with the flavoring material in the core portion 30. Due to this, the aerosol-forming rod 10 allows for a simultaneous production of aerosols and flavoring additives. Advantageously, this enhances the diversity of generable aerosols.

The inductively heatable aerosol-forming rods according to the present invention may be manufactured using a method and a manufacturing device 1000 as schematically illustrated in FIG. 3.

The manufacturing device 1000 comprises a sleeve material supply 200 configured for supplying a sleeve material 201 to a sleeve-forming device 130 of the shaping device 100. The sleeve material supply 200 comprises an unwinding unit 210 for unwinding the sleeve material 201 provided on a bobbin 211. Downstream of the unwinding unit 210, the manufacturing device 1000 further comprises a buffer 220 for buffering the sleeve material 201, a treatment unit 230 for pre-treating the sleeve material 201, a tensioning unit 600 for adjusting the tension of the sleeve material 201 and dispensing unit 700. In the present embodiment, the treatment unit 230 may be configured for physical treatment of the sleeve material 201, for example, for crimping the sleeve material 201. Crimping the sleeve material 201 may facilitate formation of the sleeve portion in the shaping device 100. The dispensing unit 700 may be used for applying at least one of fluids, granules, particles and powders to the sleeve material, for example a fluid flavoring material.

With regard the core portion of the aerosol-forming rod, the manufacturing device 1000 also comprises a core material supply 300 which is configured for supplying a core material 301 to a core-forming device 130 of the shaping device 100. The core material supply 300 comprises an unwinding unit 310 for unwinding the core material 301 that is provided on a bobbin 311.

Likewise, the manufacturing device 1000 comprises a first susceptor supply 400 and a second susceptor supply 500 which are configured for supplying a continuous susceptor profile 401 and a second continuous susceptor profile 501, respectively, to the shaping device 100. The first susceptor supply 400 comprises a first unwinding unit 410 for unwinding the first susceptor profile 401 that is provided on a bobbin 411. Likewise, the second susceptor supply 500 comprises a second unwinding unit 510 for unwinding the second susceptor profile 501 that is provided on a bobbin 411. Downstream of the unwinding units 410, 510, the manufacturing device 1000 further comprises a first treatment unit 430 and a second treatment unit 530 for pre-treating the first susceptor profile 401 and the second susceptor profile 501, respectively. In the present embodiment, the first treatment unit 430 and the second treatment unit 530 are configured to create a plurality of perforations in the respective susceptor profile 401, 501 and to stretch the respective perforated susceptor profile 401, 501 at least along a first direction, here in the direction of travel through the manufacturing device 1000, such as to create an expanded susceptor profile which comprises a plurality of openings 441, 551 originating from the plurality of perforations. An example of such expanded susceptor profiles 401, 501 is shown in FIG. 5.

To obtain an aerosol-forming rod 10 as shown in FIG. 1 and FIG. 2, the sleeve material 201, the core material 301 as well as the first susceptor profile 401 and the second susceptor profile 501 need to be combined and shaped such as to create a core portion, a first susceptor, a second susceptor and a sleeve portion arranged around the core portion, the first susceptor and the second susceptor. For this, the manufacturing device 1000 comprises a shaping device 100 which is arranged downstream of the aforementioned units and into which the sleeve material 201, the core material 301 as well as the first susceptor profile 401 and the second susceptor profile 501 are simultaneously fed, as shown in FIG. 3.

FIG. 4 shows details of the shaping device 100, wherein the lower part of FIG. 4 is a longitudinal cross-section through the device 100 and the upper part of FIG. 4 comprises three transverse cross-sections through the device 100 at three different longitudinal positions as indicated in the lower part of FIG. 4. According to the invention, the shaping device 100 comprises a sleeve forming device 120, a core-forming device 130 and a common longitudinally guide 140 which realizes (all-in-one) a first longitudinally guide and a second longitudinally guide for gathering the first susceptor profile 401 and the second susceptor profile 501, respectively.

In the present embodiment, the core-forming device 130 comprises an inner funnel 131 which is configured for gathering the core material 301 into a continuous core strand such that upon passing through the core-forming device 301 the continuous core strand has a cross-sectional shape corresponding to a cross-sectional shape of the cylindrical core portion of the aerosol-forming rod to be manufactured. In correspondence with the radial position of the core portion in the aerosol-forming rod, the center axis of the inner funnel is coaxial to a longitudinal center axis 107 of the shaping device 100.

The common longitudinal guide 140 is configured for arranging the first continuous susceptor profile 401 and the second continuous susceptor profile 501 relative to the continuous core strand such as to laterally abut the continuous core strand in a non-bonded manner upon passing through the inner funnel 131. In the present embodiment, the common longitudinal guide 140 comprises a guiding tube 141 which is arranged coaxially to the longitudinal center axis 107 of the shaping device 100 and extends downstream into an upstream section of the core-forming device 130. In the upstream section of the core-forming device 130, the first core material and the second core material are already pre-gathered. The upstream section of the core-forming device 130 has a length 109 which is about 30 percent of the total length 108 of the core-forming device 130.

As can be seen in the upper part of FIG. 4, the guiding tube 141 has a rectangular cross-section, the upper and lower outer surfaces of the guiding tube 141 provides a first guiding surface 142 and a second guiding surface 144. Together with the side walls, the upper wall and the lower wall of the inner funnel 131, each of the guiding surfaces 142, 144 forms a guiding channel 143, 145 which the first susceptor profile 401 and the second susceptor profile 501, respectively, is fed into, such as to be initially separated from the core material 301 in the upstream section of the core-forming device 130.

In this configuration, the inner void of the common guiding tube 141 is configured for passing and guiding the core material therethrough. This setup may be particularly advantageous with regard to a compact design of the shaping device 100. As to this, the guiding tube 141 serves as part of the core-forming device for pre-gathering the core material.

At the downstream end of the longitudinal guide 140, the first susceptor profile 401 and the second susceptor profile 501 are released from guidance allowing the susceptor profiles 401, 501 to come together with the pre-gathered core material at a position corresponding to their pre-defined position in the final aerosol-forming rod.

For gathering the sleeve material into a continuous sleeve strand around the continuous first core strand, the second core strand and the susceptor, the shaping device 100 comprises a sleeve forming device 120. Like the core-forming device 130, the sleeve forming device 120 also comprises a funnel, which is an outer funnel 121 arranged around at least a downstream section of the core-forming device 130. In the present embodiment, the outer funnel 121 even extends along the entire length of the core-forming device 130 such that the inner funnel 131 is completely received within the outer funnel 121. A downstream end of the core-forming device 130 opens out into a downstream section of the sleeve-forming device, where the sleeve material is already pre-gathered. Thus, at the downstream end of the core-forming device 130, the continuous core strand and the susceptor profile—which laterally abuts the continuous core strand—are released into pre-gathered sleeve material. This may be advantageous with regard to positional stability of the core portion and the susceptor at their desired positions in the final aerosol-forming rod.

As further shown in FIG. 4, the shaping device 100 further comprises two guiding fins 180 arranged at an inner surface of the outer funnel 121 of the sleeve-forming device 120. These guiding fins 180 are configured to guide the sleeve material towards the downstream end of the sleeve-forming device 120. Advantageously, the guiding fins 180 may help to reduce undesired heating of the sleeve-forming device and the core-forming device during the sleeve-forming process that may occur due to friction between the different parts of the shaping device 100 and the sleeve material.

To adjust the position of the core portion, the first susceptor and the second susceptor within the aerosol-forming rod, the shaping device comprise a first translation stage 171 and a second translation stage 172 operatively coupled to the common longitudinal guide 140 and the core-forming device 130, respectively. In the present invention, the first translation stage 171 is configured to adjust an axial position of the common longitudinal guide 140 relative to the core-forming device 130 along the longitudinal center axis 107 of the shaping device 100. This enables to adjust the axial position where the first susceptor profile 401 and the second susceptor profile 501 come together with the pre-gathered core material. The second translation stage 172 is configured to adjust the position of the core-forming device 130 relative to the sleeve-forming device 120 along three directions, namely, a first direction being parallel to the longitudinal center axis 107 of the shaping device 100, a second direction perpendicular being to the longitudinal center axis 107 and third direction being perpendicular to the second direction and to the longitudinal center axis 107. By this, the position where the continuous core strand and the susceptor come together with the pre-gathered sleeve material may be controlled in three dimensions.

At the downstream end of the sleeve-forming device 120, the entity of the continuous sleeve strand core strand, the first susceptor profile, the second susceptor profile and the continuous core strand leaves the shaping device 100. Within the entity, the continuous sleeve strand has a cross-sectional shape corresponding to a cross-sectional shape of the sleeve portion, the continuous core strand has a cross-sectional shape corresponding to a cross-sectional shape of the core portion, wherein the first susceptor and the second susceptor laterally abut the continuous core strand at opposite sides.

Referring again to FIG. 3, the manufacturing device 100 further comprises a rod-forming device 800 downstream of the shaping device 100 which is configured for forming the entity of the continuous core strand, the first susceptor profile, the second susceptor profile and the continuous sleeve strand into a continuous aerosol-forming rod strand. As described above but not shown in FIG. 3, the rod-forming device 800 may comprise a garniture tape which interacts with the at least one semi-funnel to form the final rod shape. The garniture tape may further support a wrapper supplied by a wrapper supply (not shown) into an upstream end of the rod-forming device 800. In operation, the wrapper is automatically wrapped around the substrate web as the latter is progressively gathered around the sleeve portion such that a continuous aerosol-forming rod strand being entirely surrounded by a wrapper leaves the rod-forming device 800 at its downstream end.

Downstream of the rod-forming device, the manufacturing device 1000 may further comprise a cutting device 900 for cutting continuous aerosol-forming rod strand into individual inductively heatable aerosol-forming rods according to the present invention.

The invention claimed is:

1. An inductively heatable aerosol-forming rod for an aerosol-generating article, the inductively heatable aerosol-forming rod comprising:

at least one cylindrical core portion comprising at least one of a first aerosol-forming substrate and a first flavoring material;

a first elongate susceptor laterally abutting the at least one cylindrical core portion at a first side along a longitudinal axis of the inductively heatable aerosol-forming rod;

a second elongate susceptor laterally abutting the at least one cylindrical core portion at second side along the longitudinal axis of the inductively heatable aerosol-forming rod opposite to the first side such that the at least one cylindrical core portion is sandwiched between the first elongate susceptor and the second elongate susceptor; and a sleeve portion arranged around the at least one cylindrical core portion, the first elongate susceptor, and the second elongate susceptor, the sleeve portion comprising at least one of a filler material, a second aerosol-forming substrate, and a second flavoring material.

2. The inductively heatable aerosol-forming rod according to claim 1, wherein the at least one cylindrical core portion further comprises at least one of:

a porous substrate or foam based on tobacco fibers, wherein the tobacco fibers at least partially form the first aerosol-forming substrate, a porous substrate or foam based on botanical fibers, wherein the botanical fibers at least partially form the first aerosol-forming substrate, a filler comprising a cut tobacco material, wherein the cut tobacco material at least partially forms the first aerosol-forming substrate, a filler comprising a cut botanical material, wherein the cut botanical material at least partially forms the first aerosol-forming substrate, a liquid retention material including an aerosol-forming liquid, wherein the aerosol-forming liquid at least partially forms the first aerosol-forming substrate, a liquid retention material including at least one flavoring substance, wherein the at least one flavoring substance at least partially forms the first flavoring material, cellulose fibers or cellulose-based fibers, including a flavoring substance, wherein the flavoring substance at least partially forms the first flavoring material.

3. The inductively heatable aerosol-forming rod according to claim 1, wherein the sleeve portion further comprises at least one of:

a porous substrate or foam based on tobacco fibers, wherein the tobacco fibers at least partially form the second aerosol-forming substrate, a porous substrate or foam based on botanical fibers, wherein the botanical fibers at least partially form the second aerosol-forming substrate, a filler comprising a cut tobacco material, wherein the cut tobacco material at least partially forms the second aerosol-forming substrate, a filler comprising a cut botanical material, wherein the cut botanical material at least partially forms the second aerosol-forming substrate, a liquid retention material including an aerosol-forming liquid, wherein the aerosol-forming liquid at least partially forms the second aerosol-forming substrate, a liquid retention material including at least one flavoring substance, wherein the at least one flavoring substance at least partially forms the second flavoring material, cellulose fibers or cellulose-based fibers, cellulose fibers or cellulose-based fibers, including a flavoring substance, wherein the flavoring substance at least partially forms the second flavoring material, acetate tow expanded fibers, botanical expanded fibers, or paper.

4. The inductively heatable aerosol-forming rod according to claim 1, wherein the second aerosol-forming substrate is different from the first aerosol-forming substrate.

5. The inductively heatable aerosol-forming rod according to claim 1, wherein at least one of the first elongate susceptor and the second elongate susceptor comprises an expanded metal sheet comprising a plurality of openings through the expanded metal sheet.

6. The inductively heatable aerosol-forming rod according to claim 1, wherein the at least one cylindrical core portion has a rectangular cross-section, or a quadratic cross-section, or a semi-elliptical cross-section, or a semi-circular cross-section.

7. The inductively heatable aerosol-forming rod according to claim 1, wherein the at least one cylindrical core portion is symmetrically arranged with respect to a longitudinal center axis of the inductively heatable aerosol-forming rod.

8. The inductively heatable aerosol-forming rod according to claim 1, wherein at least of the first elongate susceptor and the second elongate susceptor is strip-shaped, and wherein a width extension of the strip-shaped first elongate susceptor and the strip-shaped second elongate susceptor, respectively, is constant or varies along a longitudinal center axis of the inductively heatable aerosol-forming rod.

9. An aerosol-generating article comprising an inductively heatable aerosol-forming rod according to claim 1.

10. A shaping device for manufacturing of inductively heatable aerosol-forming rods according to claim 1, the shaping device comprising:

a core-forming device configured to gather a core material, comprising at least one of the first aerosol-forming substrate and the first flavoring material, into a continuous core strand such that upon passing through the core-forming device the continuous core strand has a cross-sectional shape corresponding to a cross-sectional shape of the at least one cylindrical core portion;

a first longitudinal guide configured to arrange a first continuous susceptor profile relative to the continuous core strand such that upon passing through the core-forming device the first continuous susceptor profile laterally abuts the continuous core strand at a first side, wherein the first longitudinal guide extends downstream at least into an upstream section of the core-forming device;

a second longitudinal guide configured to arrange a second continuous susceptor profile relative to the continuous core strand such that upon passing through the core-forming device the second continuous susceptor profile laterally abuts the continuous core strand at a second side opposite to the first side, wherein the second longitudinal guide extends downstream at least into the upstream section of the core-forming device; and a sleeve-forming device arranged around at least a downstream section of the core-forming device and configured to gather a sleeve material, comprising at least one of the filler material, the second aerosol-forming substrate, and the second flavoring material, into a continuous sleeve strand around the continuous core strand, the first continuous susceptor profile, and the second continuous susceptor profile such that upon passing through the sleeve-forming device the continuous sleeve strand has a cross-sectional shape corresponding to a cross-sectional shape of the sleeve portion.

11. The shaping device according to claim 10, wherein the sleeve-forming device is arranged around at least the downstream section of the core-forming device.

12. The shaping device according to claim 10, wherein the core-forming device further comprises an inner funnel, and wherein the sleeve-forming device further comprises an outer funnel.

13. The shaping device according to claim 10, wherein the first longitudinal guide and the second longitudinal guide are at least partially realized by a common guiding tube extending downstream at least into the upstream section of the core-forming device.

14. The shaping device according to claim 10, further comprising at least one of:

a first translation stage configured to adjust a position of at least one of the first longitudinal guide and the second longitudinal guide relative to the core-forming device at least in one direction; and a second translation stage configured to adjust a position of the core-forming device relative to the sleeve-forming device at least in one direction.

15. The shaping device according to claim 10, further comprising one or more guiding fins arranged at at least one of an inner surface of the sleeve-forming device and an outer surface of the core-forming device.

* * * * *